US008997329B1

(12) United States Patent
Ingram

(10) Patent No.: US 8,997,329 B1
(45) Date of Patent: Apr. 7, 2015

(54) CRATE ASSEMBLY JIG SYSTEM, ASSEMBLY, AND METHOD

(71) Applicant: Michael D. Ingram, McHenry, IL (US)

(72) Inventor: Michael D. Ingram, McHenry, IL (US)

( * ) Notice: Subject to any disclaimer, the term of this patent is extended or adjusted under 35 U.S.C. 154(b) by 195 days.

(21) Appl. No.: 13/762,602

(22) Filed: Feb. 8, 2013

(51) Int. Cl.

| | |
|---|---|
| ***B23Q 3/00*** | (2006.01) |
| ***B25G 3/00*** | (2006.01) |
| ***B25D 1/00*** | (2006.01) |
| ***B25B 11/00*** | (2006.01) |
| ***B23P 19/10*** | (2006.01) |

(52) U.S. Cl.
CPC ............... *B25B 11/002* (2013.01); *B23P 19/10* (2013.01)

(58) Field of Classification Search
USPC ................ 29/464, 719, 428, 418, 525, 281.1, 29/281.5, 271; 403/13; 335/285, 286, 302; 294/65.5; 81/24, 23, 44
See application file for complete search history.

(56) References Cited

U.S. PATENT DOCUMENTS

| | | | |
|---|---|---|---|
| 2,597,876 A | 5/1952 | Kurkjian | |
| 2,816,790 A | 12/1957 | Johnson | |
| 2,829,369 A | 4/1958 | Browning | |
| 2,985,369 A | 5/1961 | Hibbard et al. | |
| 3,765,588 A | 10/1973 | Frederickson | |
| 4,139,036 A | 2/1979 | Regan et al. | |
| 4,367,778 A | 1/1983 | Bradbury | |
| 4,465,115 A | 8/1984 | Palomera | |
| 4,960,235 A | 10/1990 | Gregory | |
| 5,481,813 A | 1/1996 | Templeton | |
| 5,707,375 A | 1/1998 | Durham et al. | |
| 5,894,764 A * | 4/1999 | Hanlon | 81/23 |
| 6,124,777 A | 9/2000 | Snider | |
| 6,357,101 B1 | 3/2002 | Sarh et al. | |
| 7,753,913 B2 | 7/2010 | Szakelyhidi, Jr. et al. | |
| 7,779,730 B2 | 8/2010 | Jones | |
| 2005/0080427 A1 | 4/2005 | Govari et al. | |
| 2006/0042068 A1 | 3/2006 | Whitworth et al. | |
| 2010/0249782 A1 | 9/2010 | Durham | |

* cited by examiner

*Primary Examiner* — John C Hong
(74) *Attorney, Agent, or Firm* — Meroni & Meroni, P.C.; Charles F. Meroni, Jr.; Christopher J. Scott

(57) ABSTRACT

A jig assembly is used to manufacture shipping crates essentially functioning to prevent damage to crate-bound material. The jig assembly includes a jig form and magnets. The jig form has a front portion, a rear portion, and a top portion extending between and connecting the front and rear portions. The front portion is parallel to the rear portion such that the front, rear, and top portions together define a board-receiving channel. The front portion has a pair of fastener-aligning slots and a pair of magnet-positioning bores for receiving and positioning the magnets. Fasteners are positioned by the slots and magnets. The board-receiving channel receives a first board of a crate assembly. The properly aligned fasteners may then be driven through the first board into a second board of the crate assembly so as to prevent damage to the crate-bound material. Certain jigging methodology is further supported by the jig assembly.

20 Claims, 9 Drawing Sheets

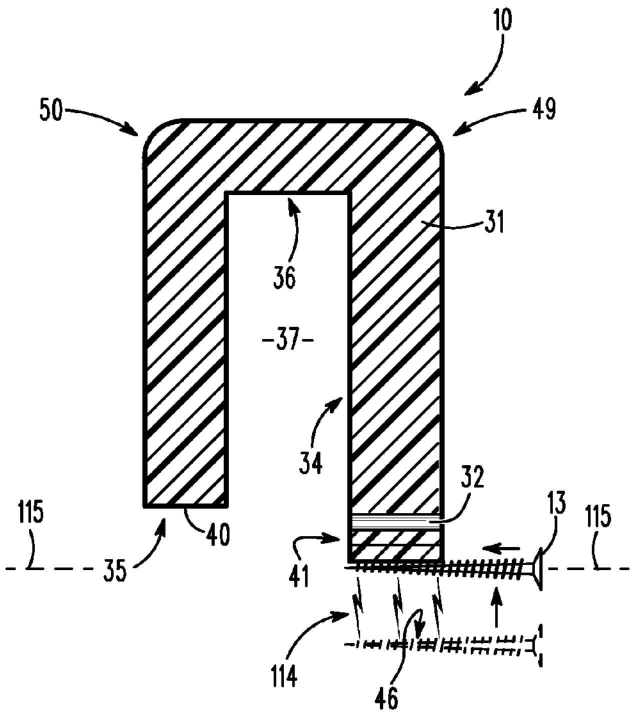
*FIG. 12*
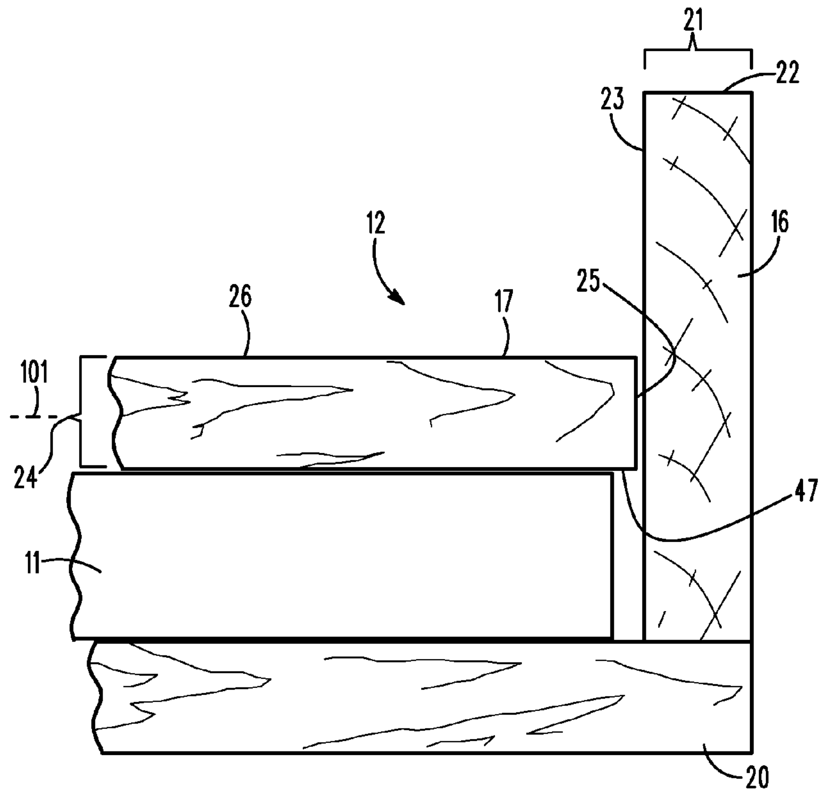

PRIOR ART

CRATE ASSEMBLY JIG SYSTEM, ASSEMBLY, AND METHOD

BACKGROUND OF THE INVENTION

1. Field of the Invention

The present invention relates generally to a jig device or assembly for use in the manufacture of crate assemblies. More particularly, the present invention relates to a jig device or assembly for maintaining the proper alignment of certain fasteners during the assembly of crates for shipping precious cargo.

2. Brief Description of the Prior Art

Jigs or templates are well known in the metalworking and woodworking arts, having been known long before the industrial age. There are many types of jigs, and each one is typically custom-tailored to perform a specific function. Many jigs are created because there is a necessity to do so by the tradesmen, while others are developed to increase productivity, to perform repetitious activities, and to perform a specific function more precisely.

Essentially, a jig is a type of tool used to control the location and/or motion of another tool. A jig's primary purpose is to provide repeatability, accuracy, and interchangeability in the manufacturing of products. A device that simultaneously holds a work and guides a tool is called a jig.

Tools or jigs designed to hold and guide fasteners during fastening engagement of a work piece are somewhat less well known in the arts. Still lesser known, are tools or jig devices that incorporate magnetic means for aligning fasteners and the like for accurate fastening engagement. A description of some of the more pertinent fastener-holding/guiding art is briefly set forth hereinafter.

U.S. Pat. No. 2,597,876 ('876 patent), which issued to Kurkjian, discloses a Magnetic Nail-Holding Hammer. The '876 patent describes an article of manufacture comprising a hammer head having a conventional shank, which shank has a longitudinally extending nail receiving channel, a nail head abutment wall at one end of the channel, and a magnetism localizing element fitted in the shank.

One end of the shank communicates with the channel intermediate the ends of the channel for releasably retaining a nail in the channel. The magnetism localizing element retains a certain magnetic flux localized in close proximity to the element in a manner whereby metal objects such as nails, screws and the like, will not be picked up by the hammer upon contact and whereby a nail may only be releasably held by the hammer when the nail is placed within the channel.

U.S. Pat. No. 3,765,588 ('588 patent), which issued to Frederickson, discloses a Nail Feeding Apparatus. The '588 patent describes a nail feeding apparatus for use with a supply of nails and a reciprocating hammer wherein a magnet fixed to a receiver plate with a nail shaft aligning groove therein magnetically attracts to and retains successively arriving nails along the groove as they are supplied from a delivery means spaced from and confronting the receiver plate. Each nail is retained in nailing relationship while the hammer drives the nail into nailable material.

The plate has an angled section thereon and is movably mounted relative to the hammer so that as the hammer strikes the angled section of the receiver plate the plate moves from a first position within the path of the hammer to a second position outside the path of the hammer, leaving the nail behind to be driven by the hammer without interference from the plate, the moving receiving plate triggering the release of a successive nail which is then attracted to the groove and seized by the magnet when the plate returns to first position.

U.S. Pat. No. 4,139,036 ('036 patent), which issued to Regan et al., discloses a Screw Starter. The '036 patent describes a housing having top and bottom openings provided with an interior flexible sheet containing a cross-slit for holding a screw in a vertically upright position. The bottom opening is placed over the point into which the screw is to be threaded. A screwdriver may be inserted through the top opening to engage the slot in the screw head so that the screw can be threaded.

A plurality of screws can be similarly inserted into a plurality of cross-slits formed along the length of a strip in order sequentially to advance each screw into a position which is vertically aligned with the top and bottom openings. The strip may contain sprocket holes which are engaged by a sprocket mounted in a housing for advancing the strip. The strip may also be provided with detent holes for cooperation with a detent means mounted on the housing for facilitating the positioning of each screw.

U.S. Pat. No. 4,465,115 ('115 patent), which issued to Palomera, discloses a Hammerhead. The '115 patent describes an improved hammerhead characterized by certain nail retaining means for facilitating initial driving of the nail without the requirement of holding the nail in the hand of a user. The nail retaining means incorporates an elongate recess sized to receive and self-align the shank portion of the nail upon the hammerhead, an angular-shaped pocket sized to receive the head portion of the nail and a magnet insert positioned proximal the angular-shaped pocket adapted to maintain the nail in the elongate recess during initial driving. The magnet insert is readily removable from the hammerhead to permit rapid replacement after its magnetic flux force has deteriorated through prolonged use.

U.S. Pat. No. 5,707,375 ('375 patent), which issued to Durham et al., discloses a magnetic positioning system for assisting in positioning a fastening element at a desired concealed internal location such as in a preformed opening in an interlocking nail in a long bone of a limb of a patient who has suffered a bone fracture. The arrangement includes: a first permanent ("target") magnet positioned at the internal location and a positioning device for a second permanent ("targeting") magnet. The positioning device comprises a hand-held drill and a magnetic aiming device mounted on the drill.

The aiming device includes a pivot member including the second magnet and is disposed at one end thereof having an axial bore. A mount for the pivot member permits three degrees of movement of the pivot member so as to enable the second magnet to align with the first magnet. The positioning device also includes a guide pin which is insertable into the axial bore and which is engaged by the drill chuck of the drill when the magnets are aligned. This enables the guide pin to be advanced by the drill along a path of travel in alignment with the first magnet and thus with the internal location. This path is ultimately followed by the fastening element.

It will be seen from a review of the foregoing in particular, and the general field of jigs and fastener holding implements generally that the prior art perceives a need for a crate assembly jig implement or device that functions to hold at least one fastener in proper alignment so that the fastener, when driven, does not penetrate materials bound by the crate assembly. Accordingly, the present invention provides a jig assembly for use in the manufacture of crate assemblies having precise specifications to properly protect crate-bound precious cargo during assembly and shipment as summarized in more detail hereinafter.

SUMMARY OF THE INVENTION

The present invention provides a jig assembly for preventing inadvertent damage to crate-bound materials during crate assembly. During assembly of crate assemblies axial fasteners often become misaligned, their axes becoming oriented in directions that are non-parallel to board surfacing, and in some cases may damage the crate bound materials.

The jig assembly according to the present invention is designed with a view toward enabling the user to assemble shipping crates or crate assemblies with more precise fastener alignment. The jig assembly according to the present invention preferably comprises a jig construction or form, and at least one, but preferably two pin-type, rod-like, or cylindrical magnets. The jig is preferably of a singular material construction and is formed so as to comprise a generally inverted J-shaped transverse cross-section.

The inverted J-shaped transverse cross-section is preferably contoured with relatively precise specifications so as to cooperate with the board specifications of a crate assembly. More particularly, the jig construction or form preferably comprises a substantially uniform end-to-end width, a front or outer portion, a rear or inner portion, and a top portion extending between and connecting the front portion and rear portion.

The front or outer portion is preferably parallel to the rear or inner portion such that the front, rear, and top portions together define a board-receiving channel. The rear or inner portion is abbreviated in length relative to the front or outer portion. The difference in length between the front or outer portion and the rear or inner portion is purposeful for defining a board-receiving thickness. The board-receiving channel has a channel width and a channel depth.

The rear or inner portion preferably comprises a planar board-engaging surface extending parallel to the top portion. The front or outer portion preferably comprises a frontal portion length, a fastener-engaging end, at least one, but preferably two fastener-aligning slots or channels, and at least one, but preferably two magnet-positioning bores.

The first and second fastener-aligning slots or channels and the first and second magnet-positioning bores are preferably and respectively coplanar. The slots and bores are structurally situated adjacent the fastener-engaging end, which fastener-engaging end preferably comprises a planar frontal surface parallel to the board-engaging surface. The slots or channels are preferably formed in the surface intermediate the end-to-end width. First and second magnets are preferably received in the magnet-receiving bores at a distance from the surface so as to effectively attract ferrous or magnetically attractable material positionable at the slots or channels.

To operate the jig assembly, slot- or channel-engaging portions of fasteners are preferably positioned against/within the fastener-aligning slots or channels. The magnets magnetically attract and hold the slot-engaging portions of fasteners at the fastener-aligning slots or channels. The board-receiving channel receives the first channel entry edge of a first board such that the board-engaging surface engages and abuts the device-engaging surface of a second board.

The fastener-aligning slots or channels align and position the axes of the fasteners intermediate the second board thickness parallel to the device-engaging surface of the second board. The properly aligned fasteners can then be driven through the first board orthogonal to the first board plane parallel to the device-engaging surface into the first board attachment end by way of rotary drill action or similar other fastener-driving means.

The properly aligned fasteners may thus operate to fasten the first board attachment end to the first board attachment surface. Notably, the fasteners, when so properly aligned, do not pierce the board surfacing, and thus crate-bound materials are indirectly protected by way of the jig assembly.

BRIEF DESCRIPTION OF THE DRAWINGS

Other features of my invention will become more evident from a consideration of the following brief descriptions of illustrations of the subject invention:

FIG. 11(*a*) is a diagrammatic depiction of an H-shaped cross-section of three boards of the crate assembly, which H-shaped cross-section shows a first or left board-to-board T junction and a second or right board-to-board T junction.

FIG. 12 is an enlarged depiction of a partial crate assembly bearing a generic crate-bound structure in exploded relation relative to (a transverse cross-sectional depiction of) the jig assembly according to the present invention depicted holding a fastener in proper alignment.

FIG. 13(*a*) is a fragmentary sectional depiction of a partial crate assembly bearing a generic crate-bound structure after proper fastened attachment of a first board to a second board.

DETAILED DESCRIPTION OF THE PREFERRED EMBODIMENT AND METHODOLOGY

Figure 1:
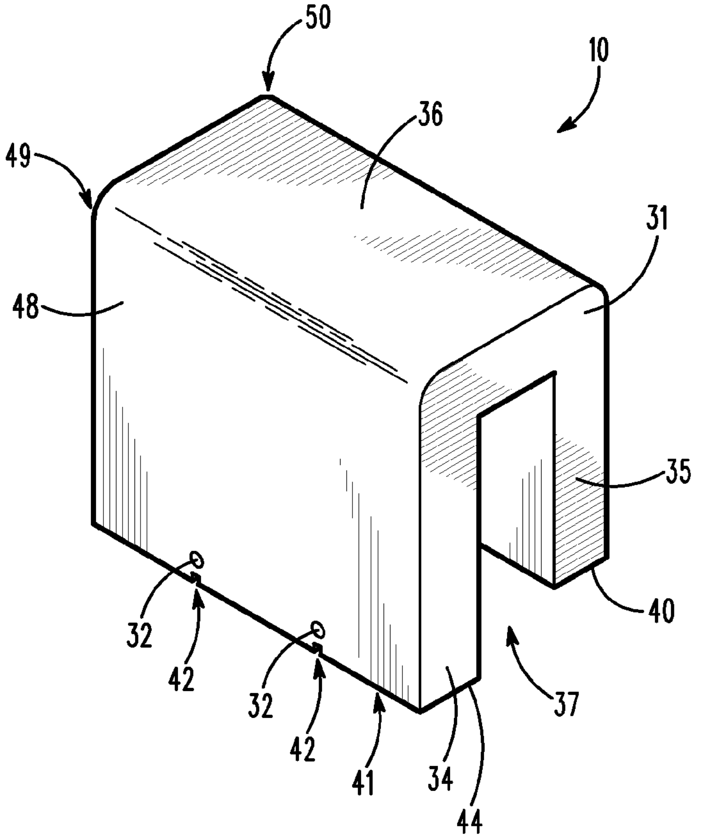
FIG. 1 is a first top frontal perspective view of the jig assembly according to the present invention in a fully assembled state.
Figure 2:
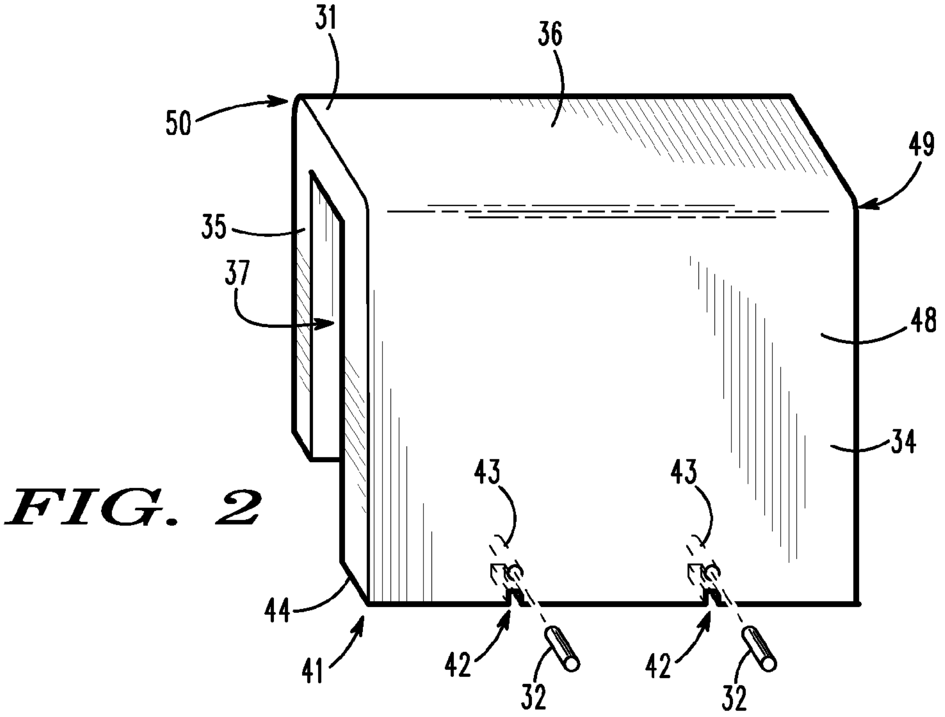
FIG. 2 is a second top frontal perspective view of the jig assembly according to the present invention depicting the jig assembly in an exploded state.
Figure 3:
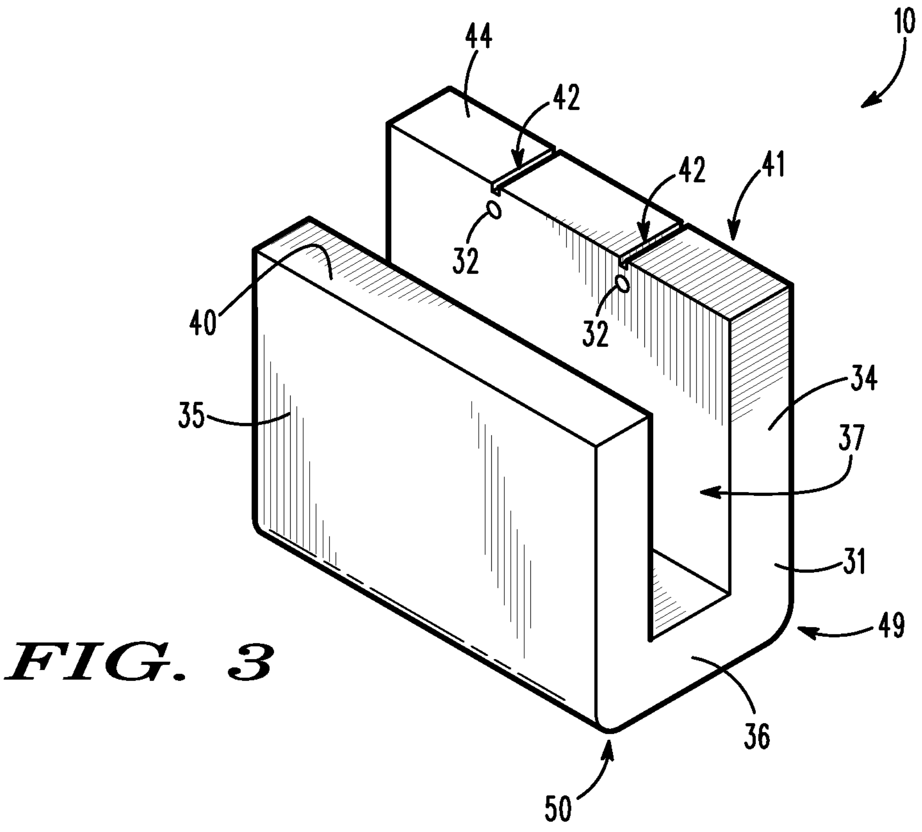
FIG. 3 is a bottom rear perspective view of the jig assembly according to the present invention in a fully assembled state.
Figure 4:
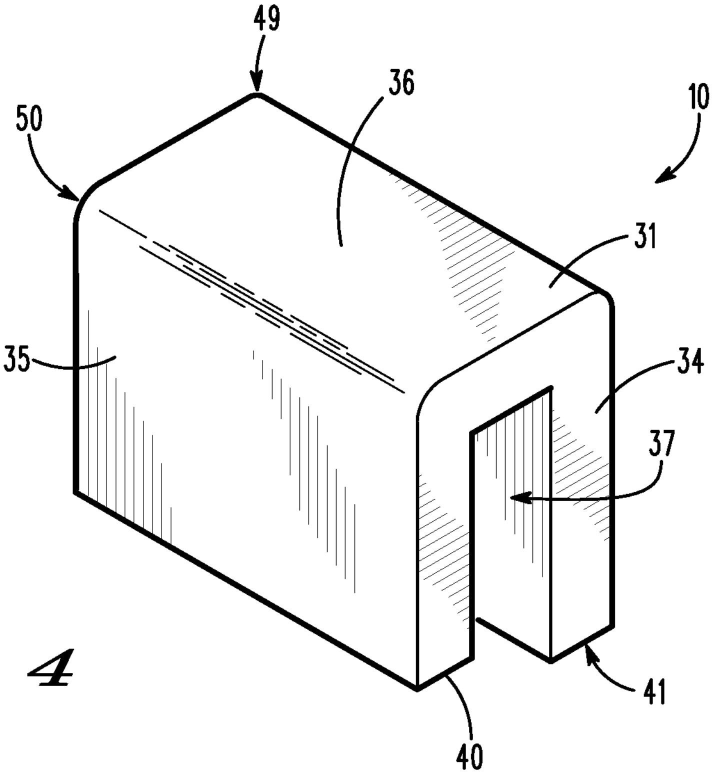
FIG. 4 is a top rear perspective view of the jig assembly according to the present invention in a fully assembled state.

Referring now to the drawings with more specificity, the preferred embodiment of the present invention provides a jig assembly as at 10 for preventing inadvertent damage to crate-bound materials during crate assembly. Fine works of art as generically depicted at 11 are often shipped via a crate assembly specifically tailored to meet the specifications of the artwork 11. For example, when a framed artistic work is shipped in commerce, the artwork 11 will very often be packaged within a crate assembly as at 12.

To ensure that the artwork 11 or similar other precious cargo are secure within the shipping crate assembly 12, the shipping crate assembly 12 must be tailored so as to package the artwork 11 or similar other precious cargo within precise specifications. The precise specifications are often critical so as to prevent shifting of the artwork 11 relative to the crate assembly 12 during shipment. From a comparative inspection of FIGS. 11-13, for example, the reader will note that boards 17 and 20 prevent vertical movement of the artwork 11.

Figure 14:
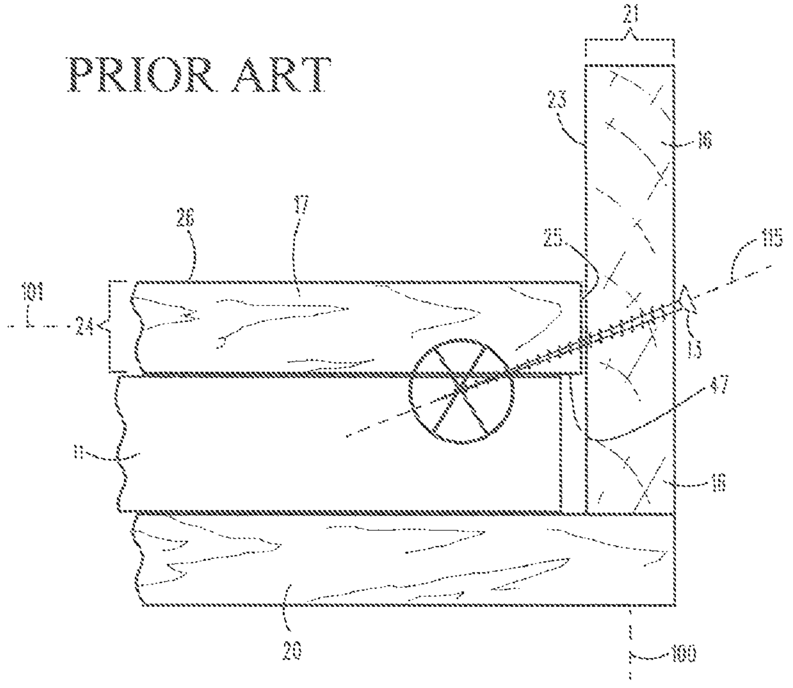
FIG. 14 is a diagrammatic depiction of a prior art partial crate assembly bearing a generic crate-bound structure after improper fastened attachment of a first board to a second board, the improper fastened attachment damaging the crate-bound structure.

During assembly of crate assemblies as referenced at 12, axial fasteners as at 13 often become misaligned, their axes 115 becoming oriented in directions that are non-parallel to board surfacing 26 and 47, which surfacing 26 and 47 would otherwise conceal the embedded fastener 13. Accordingly, fasteners 13 oftentimes inadvertently pierce board surfacing 14, and in some cases may damage the artwork 11 or similar other precious cargo as generally depicted in FIG. 14.

The jig assembly 10 according to the present invention is thus designed with a view toward enabling the user to assemble shipping crates or crate assemblies 12 with more precise fastener alignment, and thus the present invention contemplates not only an inventive jig assembly 10, but also a crate assembly jig system or system of components, including the jig assembly 10 and at least portions of a crate assembly 12.

The crate assembly jig system according to the present invention is thus contemplated to preferably comprise, in combination, a crate assembly as at 12, a jig assembly as at 10, and at least one (ferrous or magnetically attractable) axial fastener 13 as exemplified by a threaded screw element or nail. The jig assembly 10 preferably operates, in part, by forceful magnetic attraction of jig-positioned fastener elements 13, and thus each fastener 13 is preferably constructed from ferrous or magnetically attractable material.

Figure 11A:
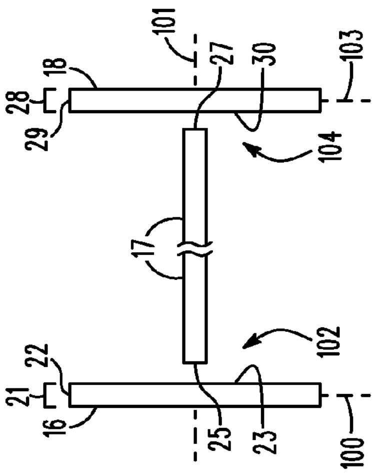
FIG. 11 is a third top frontal perspective view of the jig assembly according to the present invention depicted in exploded relation relative to a crate assembly bearing a generic crate-bound structure.
Figure 11:
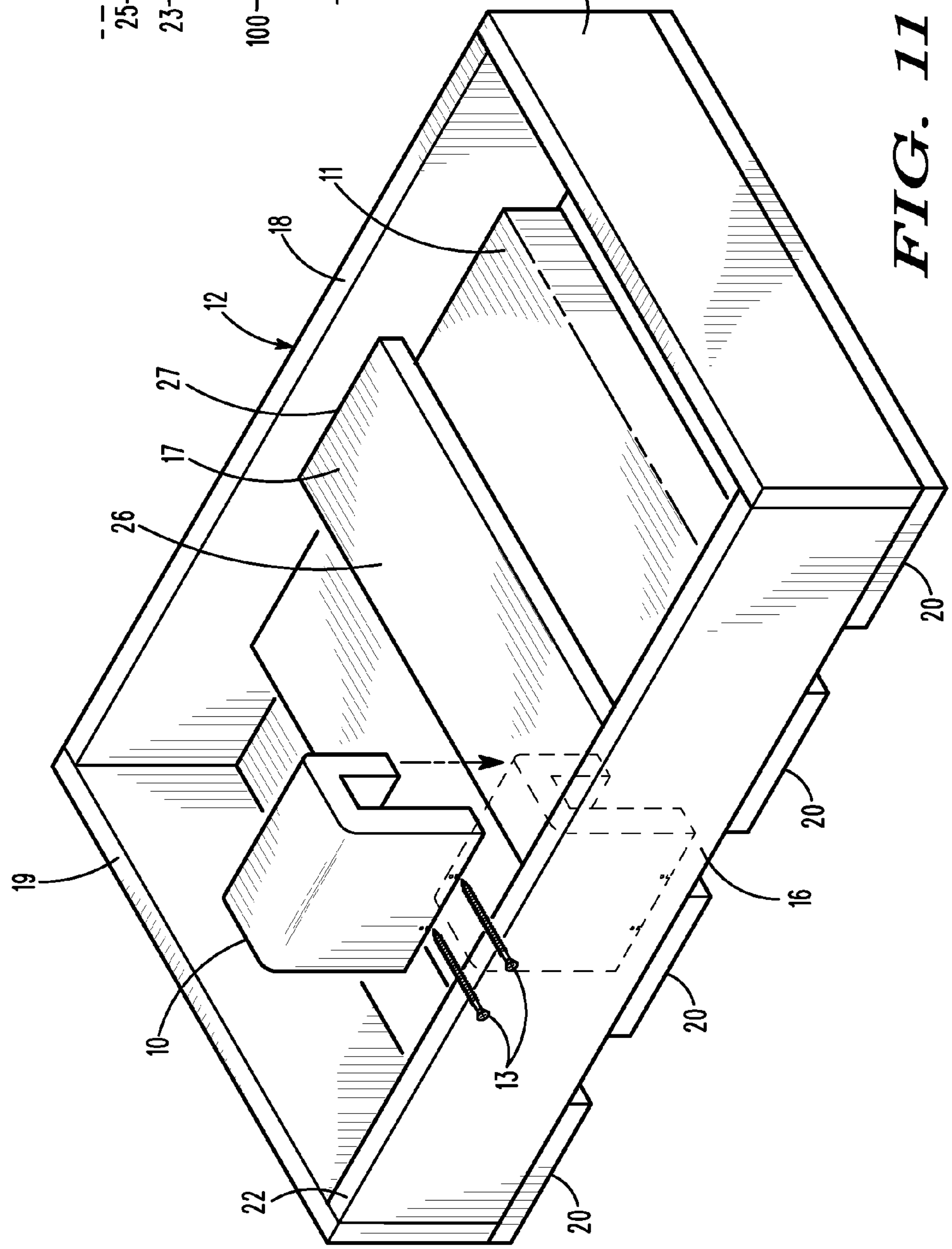

The crate assembly 12 preferably comprises at least a first board 16 and a second board as at 17, which boards 16 and 17 cooperate with the jig assembly 10 during assembly of the crate assembly 12. A third board 18, for example, will very often and necessarily be fastened to the second board 17 as generally depicted in FIG. 11, and together boards 16-18 complete an H-shaped crate construction as generally depicted in FIG. 11(*a*). Additional boards as at 19 complete the rectangular form of the crate assembly 12, and boards 20 function to provide an outside facing to the crate assembly 12.

As can be seen from an inspection of the figures, the first board 16 extends in a first board plane as generally depicted at 100, and has a first board thickness as at 21 (e.g. ≤0.75 inches), a first channel entry edge as at 22, and a planar first board-attachment surface 23. The second board 17, by contrast, extends in a second board plane as at 101, which plane 101 is orthogonal to the first board plane 100. The second board 17 has a second board thickness 24 (e.g. ≈0.75 inches), a planar first board-attachment end 25, and a planar device-engaging surface 26. The first board-attachment end 25 of the second board 17 abuts the first board-attachment surface 23 of the first board 16 at a first board-to-board T-junction 102 as generally depicted in FIG. 11(*a*).

Should the crate assembly 12 comprise a third board 18, it is contemplated that at least a second (ferrous) fastener 13 be included within the crate assembly jig system according to the present invention. The second board 17 preferably has a planar second board-attachment end as at 27. The third board 18, being substantially identical to the first board 16, extends in a third board plane 103 parallel to the first board plane 100 at the second board attachment end 27.

The third board 18 has a third board thickness as at 28 (e.g. ≤0.75 inches), a second channel entry edge 29, and a planar third board-attachment surface 30. The second board-attachment end 27 of the second board 17 abuts the third board-attachment surface 30 at a second board-to-board T-junction 104 as generally depicted in FIG. 11(*a*).

The jig assembly 10 according to the present invention preferably comprises a jig construction or form as at 31 and certain magnetic means of attraction as exemplified by at least one, but preferably two pin-type, rod-like, or cylindrical magnets as at 32. The jig 31 is preferably of a singular material construction such as high density polypropylene or similar other polymeric material and is formed so as to comprise a generally inverted J-shaped transverse cross-section as generally depicted in FIGS. 9, 10, 12, and 13.

The generally inverted J-shaped transverse cross-section, however, is preferably contoured with relatively precise specifications so as to cooperate with the board specifications for the first, second, and third boards 16-18. More particularly, the jig construction or form 31 preferably comprises a substantially uniform end-to-end width 33 on the order of about 3.5 inches from plane 110 to plane 111; a front or outer portion 34, a rear or inner portion 35, and a top portion 36 extending between and connecting the front portion 34 and rear portion 35.

The front or outer portion 34 is preferably parallel to the rear or inner portion 35 such that the front, rear, and top portions 34-36 together define a cuboidal board-receiving channel as at 37. It will be seen that the rear or inner portion 35 is abbreviated in length relative to the front or outer portion 34. An exemplary length for the rear or inner portion 35 is 2.5 inches from plane 105 to plane 106. An exemplary length for the front or outer portion 34 is 2.875 inches from plane 105 to plane 107.

The difference in length between the front or outer portion 34 and the rear or inner portion 35 (e.g. 0.375 inches) is purposeful for defining a board-receiving thickness (i.e. a portion of the second board thickness 24). The board-receiving channel 37 has a channel width 38 (e.g. ≥0.75 inches) and a channel depth 39 equal to the distance intermediate plane 105 and 106. Exemplary dimensions for the board-receiving channel 37 is 2.5 inches from plane 105 to plane 106 for the channel depth 39; 0.75 inches from plane 108 to plane 109 for the channel width 38; and 3.5 inches from plane 110 to plane 111 for the end-to-end width 33 of the jig construction 31.

The rear or inner portion 35 preferably comprises a planar board-engaging surface 40 extending parallel to the top portion 36 or plane 105 in plane 106 or orthogonally relative to the channel depth 39 or plane 111. The front or outer portion 34 preferably comprises a frontal portion length (e.g. 2.875 inches from plane 105 to plane 106); a fastener-engaging end as at 41; at least one, but preferably two fastener-aligning slots or channels as at 42; and at least one, but preferably two magnet-positioning bores as at 43.

The jig assembly 10 has an outer surface as at 48 which surface 48 enables the user to grip the jig construction 31 via one's hand. It is contemplated that the outer surface 48 may preferably a front-to-top portion junction as at 49 and a top-to-rear portion junction as at 50. The outer surface 48 at the front-to-top and top-to-rear portion junctions 49 and 50 are preferably rounded for improving manipulation of the jig assembly 10 relative to the crate assembly 12. It is contemplated that the junctions 49 and 50 may preferably comprise a 0.375 inch radius.

Figure 5:
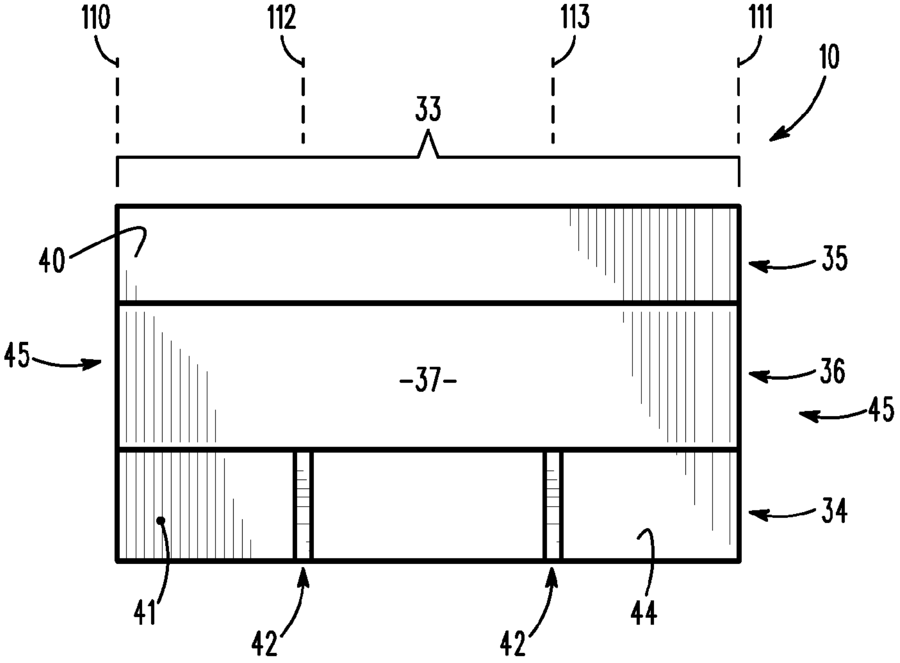
FIG. 5 is a bottom plan view of the jig assembly according to the present invention.
Figure 6:
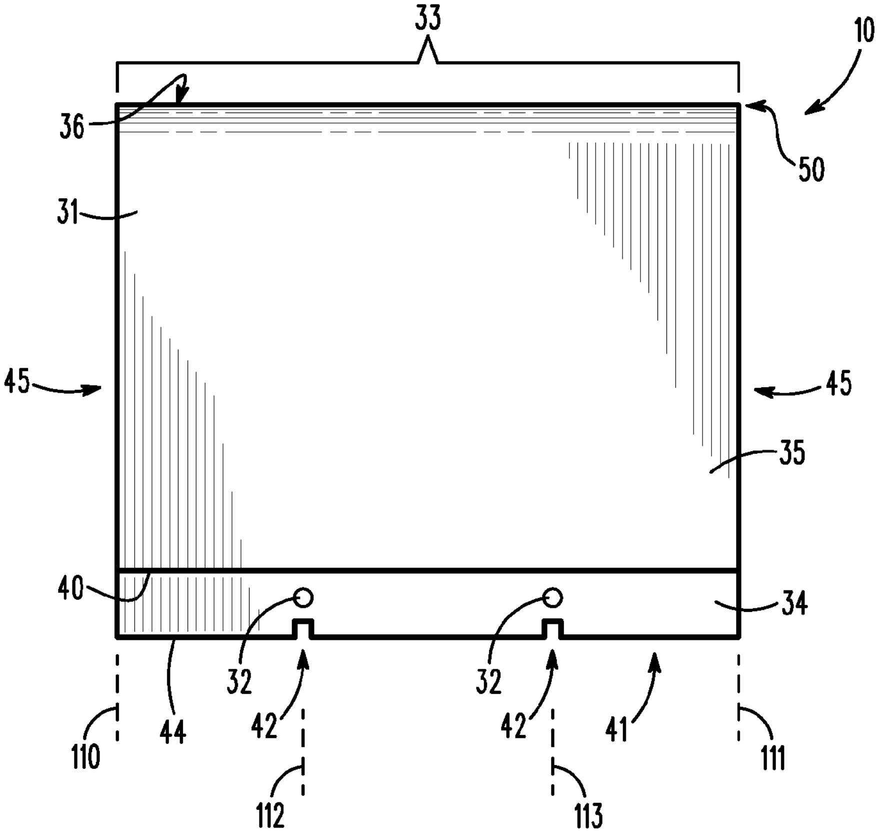
FIG. 6 is a rear elevational view of the jig assembly according to the present invention.
Figure 7:
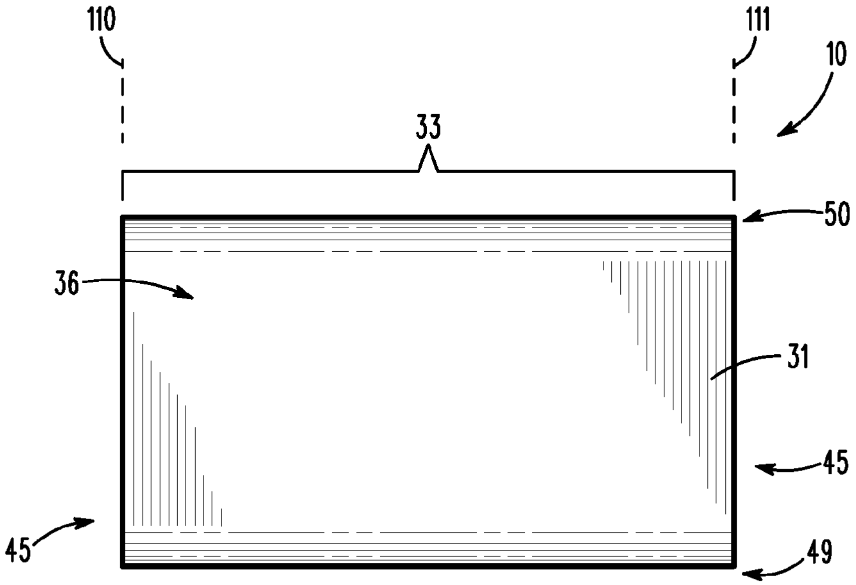
FIG. 7 is a top plan view of the jig assembly according to the present invention.
Figure 8:
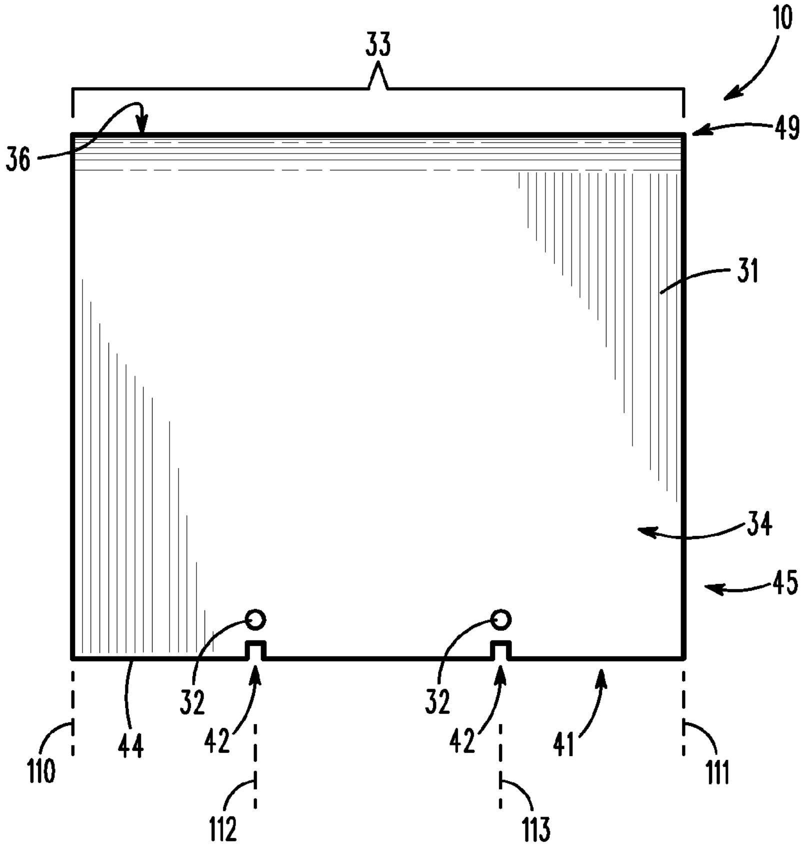
FIG. 8 is a front elevational view of the jig assembly according to the present invention.
Figure 9:
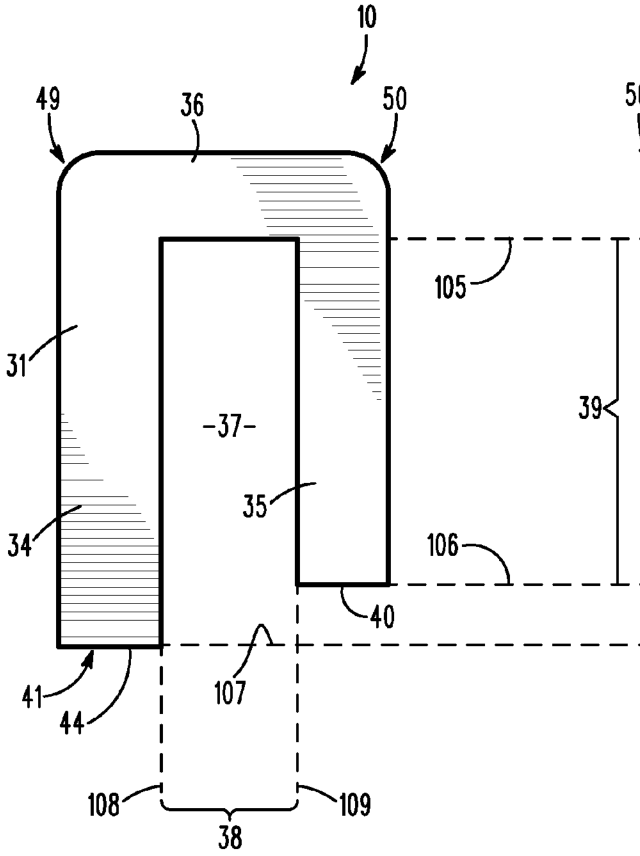
FIG. 9 is a first end view of the jig assembly according to the present invention.
Figure 10:
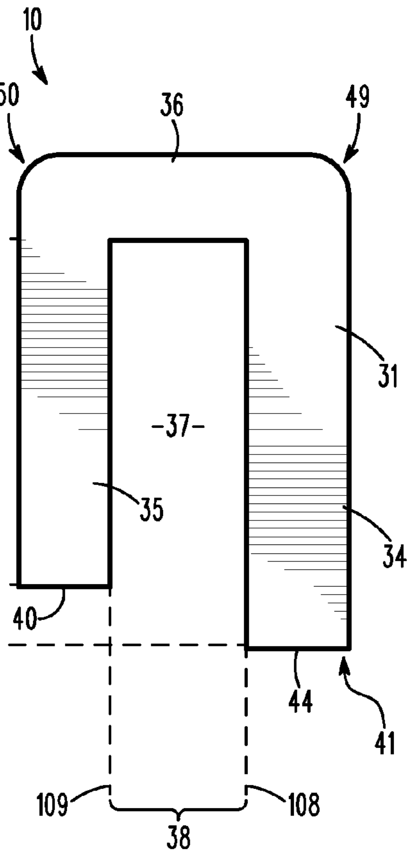
FIG. 10 is a second end view of the jig assembly according to the present invention.

The first and second fastener-aligning slots or channels 42 and the first and second magnet-positioning bores 43 are preferably and respectively coplanar in planes 112 and 113 as generally depicted in FIGS. 5, 6, and 8. The slots 42 and bores 43 are structurally situated adjacent the fastener-engaging end 41, which fastener-engaging end 41 preferably comprises a planar frontal surface 44 coplanar with plane 107 and parallel to the board-engaging surface 40. The slots or channels 42 are preferably formed in the surface 44 intermediate the end-to-end width 33, 1.0 inches from either end 45.

First and second magnets 32 are preferably received in the magnet-receiving bores 43 at a distance from the surface 44 so as to effectively attract ferrous or magnetically attractable material (i.e. the fastener(s) 13) positionable at the slots or channels 42. The jig assembly 10 as depicted in the various figures generally shows a two fastener-aligning arrangement for aligning and/or positioning first and second fasteners 13 at the slots or channels 42.

To operate the jig assembly 10, slot- or channel-engaging portions (as at 46) of the fasteners 13 are preferably positioned against/within the fastener-aligning slots or channels 42. The magnets 32 magnetically attract (as diagrammatically depicted and referenced at 114) and hold the slot-engaging portions 46 of fasteners 13 at the fastener-aligning slots or channels 42. The board-receiving channel 37 receives the first channel entry edge 22 of the first board 16 such that the board-engaging surface 40 engages and abuts the device-engaging surface 26 of the second board 17.

Figure 13A:
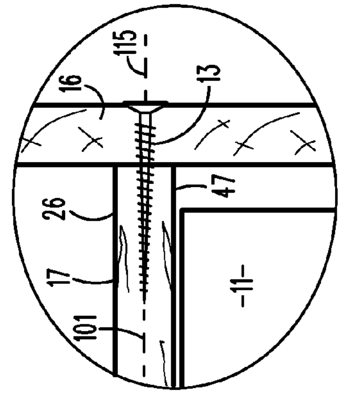
FIG. 13 is an enlarged depiction of a partial crate assembly bearing a generic crate-bound structure in assembled relation relative to (a transverse cross-sectional depiction of) the jig assembly according to the present invention depicted holding a fastener in proper alignment prior to fastened attachment of a first board to a second board.
Figure 13:
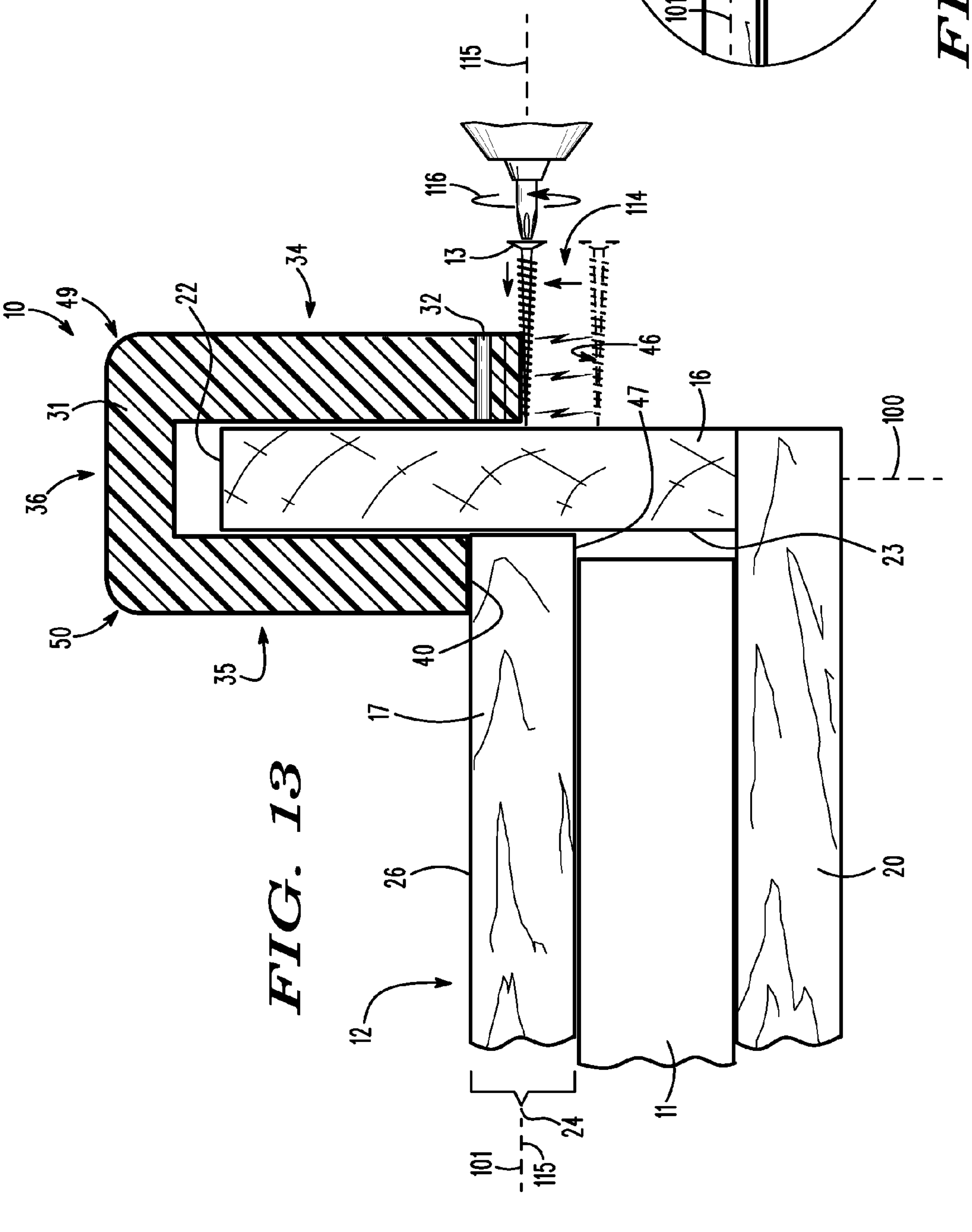

The second board thickness 24 is greater than the board-receiving thickness defined by the distance intermediate planes 106 and 107 such that the fastener-aligning slots or channels 42 align and position the axes 115 of the fasteners 13 intermediate the second board thickness 24 parallel to the device-engaging surface 26. The properly aligned fastener(s) 13 can then be driven through (or started at) the first board 16 orthogonal or normal to the first board plane 100 parallel to the device-engaging surface 26 into the first board attachment end 25 as generally depicted in FIG. 13 by way of rotary drill action as at 116, for example.

The properly aligned fasteners 13 may thus operate to fasten the first board attachment end 25 to the first board attachment surface 23 at the first board-to-board T-junction 102. Notably, the fasteners 13, when so properly aligned, do not pierce the surfacing 26 or opposite surfacing 47 of second board 17, and thus the artwork 11 or similar other precious cargo is indirectly protected by way of the jig assembly 10. The fasteners 13 may preferably be threaded for enhancing fastened attachment of the board attachment end 25 to the board attachment surface 23.

Should the user wish to attach/fasten the third board 18 to the second board 17, the jig assembly 10 may be manually outfitted with at least one additional fastener 13 by positioning the same against/within the fastener-aligning slot or channel 42, at which time the magnet(s) 32 operate to magnetically attract and hold 114 the fastener 13 at the fastener-aligning slot or channel 42.

The board-receiving channel 37 may then receive the third channel entry edge 29 of the third board 18 such that the board-engaging surface 40 re-engages and abuts the device-engaging surface 26 of the second board 17. As earlier specified, the second board thickness 24 is preferably greater than the board-receiving thickness as defined by the distance intermediate planes 106 and 107 such that the fastener-aligning slot or channel 42 aligns and positions the axis 115 of the fastener 13 intermediate the second board thickness 24 parallel to the device-engaging surface 26.

The fastener 13 may then be driven through (or started at) the third board 18 orthogonal to the third board plane 103 parallel to the device-engaging surface 26 into the second board attachment end 27. The fastener 13 may thus function to fasten the second board attachment end 27 to the third board attachment surface 30 at the second board-to-board T-junction 104.

Noting that two fasteners 13 may be driven into each of the first and third boards 16 and 18, the present system preferably contemplates a jig assembly 10 comprising at least two slots or channels 42 and at least two magnets 32 received in two bores 43. The first and second fasteners 13 may each be driven through the first board 16 or third board 18 orthogonal to the board plane(s) 100 or 103 parallel to the device-engaging surface 26 into the board attachment end(s) 25 or 27 for fastening the board attachment end(s) 25 or 27 to the board attachment surface(s) 23 or 30 at the board-to-board T-junction(s) 102 or 104. It is contemplated that two opposed, coplanar fasteners 13 may effectively function to prevent rotation of the second board 17 about the axes 115 of the fasteners 13.

While the foregoing specifications set forth much specificity, the same should not be construed as setting forth limits to the invention but rather as setting forth certain preferred embodiments and features. For example, as prefaced hereinabove, it is contemplated that the present invention essentially provides a jig assembly as generally depicted and referenced at 10.

The jig assembly 10 according to the present invention is basically designed for use in assembling shipping crates, and preferably comprises a jig device as at 31, and certain fastener-aligning means as exemplified by the cooperable slots or channels 42 and magnets 32 as positioned in the bores 43. The jig device essentially comprises a front portion, a rear portion, and a top portion connecting the front and rear portions.

The front portion is parallel to the rear portion such that the front, rear, and top portions together define a board-receiving channel. The board-receiving channel comprises a channel width and a channel depth. The rear portion comprises a board-engaging surface, and the front portion comprises a fastener-engaging end. The fastener-engaging end comprises certain fastener-aligning means as exemplified by the magnet and slot arrangements earlier specified.

The board-receiving channel receives a first board, and the board-engaging surface engages a second board. The fastener-aligning means temporarily align an axial fastener intermediate planes of outer surfacing of the second board for fastening the first board to the second board without piercing a select outer surface of the second board.

The jig construction or form as at 31 is preferably of singular material construction, and the rear portion is preferably abbreviated in length relative to the front portion, comprising an inverted J-shaped transverse cross-section. The fastener-aligning means comprise certain magnet-positioning means as exemplified by the bores 43. Together the fastener-aligning and magnet-positioning means are cooperable for aligning fasteners.

The board-engaging surface is preferably planar and extends orthogonally relative to the channel depth or parallel to the top portion. The fastener-engaging end has a planar frontal surface orthogonal to the frontal portion length or parallel to the top portion and board-engaging surface. The first fastener-aligning slot is formed in the planar frontal surface extending parallel thereto.

Certain methodology is further contemplated to be supported by the foregoing specifications. In this regard, a jigging method according to the present invention essentially prevents damage to crate-bound materials, and comprises the steps of initially forming a jig device substantially as described hereinabove; receiving a first board via the board-receiving channel; engaging a second board via the board-engaging surface; temporarily aligning at least one primary axial fastener intermediate outer surface planes of the second board via the fastener-aligning means; and fastening the first board to the second board via the aligned at least one primary axial fastener without piercing a select outer surface of the second board.

Accordingly, although the invention has been described by reference to certain preferred embodiments and certain methodologies, it is not intended that the novel arrangement and methods be limited thereby, but that modifications thereof are intended to be included as falling within the broad scope and spirit of the foregoing disclosures and the appended drawings.

I claim:

1. A crate assembly jig system for preventing damage to crate-bound material, the crate assembly jig system comprising, in combination:

a crate assembly, the crate assembly comprising a first board and a second board, the first board extending in a first board plane and having a first board thickness, a first channel entry edge, and a planar first board-attachment surface, the second board extending in a second board plane orthogonal to the first board plane and having a second board thickness, a planar first board-attachment end, and a planar device-engaging surface, the first board-attachment end abutting the board-attachment surface at a first board-to-board T-junction;

a jig assembly, the jig assembly comprising a jig form and a first magnet, the jig form being of a singular material construction and comprising a J-shaped transverse cross-section, a substantially uniform end-to-end width, a front portion, a rear portion, and a top portion extending between and connecting the front and rear portions, the front portion being parallel to the rear portion such that the front, rear, and top portions together define a cuboidal board-receiving channel, the rear portion being abbreviated in length relative to the front portion for defining a board-receiving thickness, the board-receiving channel comprising a channel width and a channel depth, the rear portion comprising a planar board-engaging surface extending parallel to the top portion, the front portion comprising a fastener-engaging end, a first fastener-aligning slot, and a first magnet-positioning bore, the first fastener-aligning slot and first magnet-positioning bore being coplanar and extending orthogonally relative to the end-to-end width adjacent the fastener-engaging end, the first magnet being received in the first magnet-receiving bore, the fastener-engaging end having a planar frontal surface parallel, the first fastener-aligning slot being formed in the planar frontal surface extending parallel thereto, the planar frontal surface being parallel to the board-engaging surface; and a first fastener, the first fastener having a first fastener axis, a first slot-engaging portion of the first fastener being positioned via the first fastener-aligning slot, the first magnet magnetically attracting and holding the first slot-engaging portion at the first fastener-aligning slot, the board-receiving channel receiving the first channel entry edge of the first board such that the board-engaging surface engages and abuts the device-engaging surface of the second board, the second board thickness being greater than the board-receiving thickness such that the first fastener-aligning slot aligns and positions the first fastener axis intermediate the second board thickness parallel to the device-engaging surface, the first fastener being drivable through the first board orthogonal to the first board plane parallel to the device-engaging surface into the first board attachment end for fastening the first board attachment end to the first board attachment surface at the first board-to-board T-junction, the jig system thus for maintaining proper alignment and fastened engagement of the first fastener during crate assembly for preventing damage to material bound by the first and second boards.

2. The crate assembly jig system of claim 1 wherein the crate assembly comprises a third board and a second fastener, the second fastener having a second fastener axis, the second board comprising a planar second board-attachment end, the third board being substantially identical to the first board and extending in a third board plane parallel to the first board plane at the second board attachment end, the third board having a third board thickness, a third channel entry edge, and a planar third board-attachment surface, the second board-attachment end abutting the third board-attachment surface at a second board-to-board T-junction, a second slot-engaging portion of the second fastener being positioned against/within the first fastener-aligning slot, the first magnet magnetically attracting and holding said second slot-engaging portion at the first fastener-aligning slot, the board-receiving channel receiving the third channel entry edge of the third board such that the board-engaging surface engages and abuts the device-engaging surface of the second board, the second board thickness being greater than the board-receiving thickness such that the first fastener-aligning slot aligns and positions the second fastener axis of the second fastener intermediate the second board thickness parallel to the device-engaging surface, the second fastener being drivable through the third board orthogonal to the third board plane parallel to the device-engaging surface into the second board attachment end for fastening the second board attachment end to the third board attachment surface at the second board-to-board T-junction, the jig system thus for maintaining proper alignment and fastened engagement of the first and second ferrous fasteners during crate assembly for preventing damage to material bound by the first, second, and third boards.

3. The crate assembly jig system of claim 1 comprising a second fastener, the second fastener having a second fastener axis, the jig assembly comprising a second magnet, and the jig form comprising a second fastener-aligning slot and a second magnet-receiving bore, the second fastener-aligning slot and the second magnet-receiving bore being respectively parallel to the first fastener-aligning slot and the first magnet-receiving bore at the fastener-engaging end, the second magnet being received in the second magnet-receiving bore, slot-engaging portions of first and second fasteners being positioned via the first and second fastener-aligning slots, the first and second magnets magnetically attracting and holding the slot-engaging portions at the first and second fastener-aligning slots, the second board thickness being greater than the board-receiving thickness such that the first and second fastener-aligning slots align and position the first and second fastener axes intermediate the second board thickness parallel to the device-engaging surface, the first and second fasteners being drivable through the first board orthogonal to the first board plane parallel to the device-engaging surface into the board attachment end for fastening the board attachment end to the board attachment surface at the board-to-board T-junction, the first and second fasteners of the jig system thus for preventing rotation of the second board about the first and second fastener axes.

4. The crate assembly jig system of claim 3 wherein a select fastener is threaded, the select fastener being selected from the group consisting of the first and second fasteners, the select fastener for enhancing fastened attachment of the board attachment end to the board attachment surface at the first board-to-board T-junction.

5. The crate assembly jig system of claim 1 wherein the jig form comprises an outer surface, a front-to-top portion junction and a top-to-rear portion junction, the outer surface at the front-to-top and top-to-rear portion junctions being rounded for improving manipulation of the jig form relative to the crate assembly.

6. A jig assembly for use in assembling shipping crates, the jig assembly comprising:

a jig form and fastener-aligning means, the jig form comprising a front portion, a rear portion, and a top portion connecting the front and rear portions, the front portion being parallel to the rear portion such that the front, rear, and top portions together define a board-receiving channel, the rear portion comprising a board-engaging surface, the front portion comprising a fastener-engaging end, the fastener-engaging end comprising said fastener-aligning means, the board-receiving channel for receiving a first board, the board-engaging surface for engaging a second board, the fastener-aligning means for temporarily aligning an axial fastener intermediate outer surfaces of the second board for fastening the first board to the second board without piercing a select outer surface of the second board.

7. The jig assembly of claim 6 wherein the jig form is of a singular material construction.

8. The jig assembly of claim 6 wherein the rear portion being abbreviated in length relative to the front portion.

9. The jig assembly of claim 8 wherein the jig form comprises a J-shaped transverse cross-section.

10. The jig assembly of claim 6 wherein the fastener-aligning means comprise magnet-positioning means, the fastener-aligning and magnet-positioning means being cooperable for aligning fasteners.

11. The jig assembly of claim 10 wherein the magnet-positioning means are defined by a magnet-receiving bore formed in the front portion parallel to the top portion, the first magnet being a cylindrical magnet and received in the magnet-receiving bore.

12. The jig assembly of claim 6 wherein the board-engaging surface is planar extending parallel to the top portion, the fastener-engaging end having a planar frontal surface parallel to the board-engaging surface, the fastener-aligning means being defined by a fastener-aligning slot being formed in the planar frontal surface extending parallel thereto.

13. The jig assembly of claim 6 wherein the jig form comprises an outer surface, a front-to-top portion junction, and a top-to-rear portion junction, the outer surface at the front-to-top and top-to-rear portion junctions being rounded for improving manipulation of the jig form.

14. A jigging method for preventing damage to crate-bound materials, the jigging method comprising the steps of:

forming a jig device, the jig device comprising a front portion, a rear portion, and a top portion connecting the front and rear portions, the front portion being parallel to the rear portion such that the front, rear, and top portions together define a board-receiving channel, the rear portion comprising a board-engaging surface, the front portion comprising a fastener-engaging end, the fastener-engaging end comprising fastener-aligning means;

receiving a first board via the board-receiving channel;

engaging a second board via the board-engaging surface;

temporarily aligning at least one primary axial fastener intermediate outer surface planes of the second board via the fastener-aligning means; and fastening the first board to the second board via the aligned at least one primary axial fastener without piercing a select outer surface of the second board.

15. The jigging method of claim 14 comprising the steps of:

receiving a third board via the board-receiving channel;

engaging the second board via the board-engaging surface;

temporarily aligning at least one secondary axial fastener intermediate outer surface planes of the second board via the fastener-aligning means; and fastening the third board to the second board via the aligned at least one secondary axial fastener without piercing the select outer surface of the second board.

16. The jigging method of claim 15 comprising the step of positioning the second board relative to the first and third boards at opposed board-to-board T junctions before the step of receiving the first board via the board-receiving channel.

17. The jigging method of claim 16 comprising the step of positioning material intermediate the first and third boards before the step of positioning the second board relative to the first and third boards.

18. The jigging method of claim 14 wherein the step of temporarily aligning the at least one primary axial fastener via the fastener-aligning means comprises the steps of:

a. positioning the axial fastener adjacent magnetic means of attraction; and b. attracting and holding the axial fastener via said magnetic means of attraction.

19. The jigging method of claim 14 wherein the jig device is formed from a singular material construction.

20. The jigging method of claim 14 wherein the rear portion is formed abbreviated in length relative to the front portion such that the jig device comprises a J-shaped transverse cross-section.

* * * * *